United States Patent [19]
Machida

[11] 3,991,956
[45] Nov. 16, 1976

[54] TAPE CASSETTE

[75] Inventor: Tetsuo Machida, Tagahya, Japan

[73] Assignee: Sony Corporation, Tokyo, Japan

[22] Filed: Jan. 14, 1975

[21] Appl. No.: 540,965

[30] Foreign Application Priority Data
Jan. 18, 1974 Japan............................ 49-8447[U]

[52] U.S. Cl................................. 242/199; 226/196; 242/76; 352/72
[51] Int. Cl.²..................... G03B 1/04; G11B 15/32; G11B 23/04
[58] Field of Search........................... 242/197–200, 242/76; 352/72–78 R; 226/189, 196

[56] References Cited
UNITED STATES PATENTS

| | | | |
|---|---|---|---|
| 3,143,270 | 8/1964 | Cohen | 226/196 |
| 3,263,936 | 8/1966 | Williams | 242/194 |
| 3,552,685 | 1/1971 | Larsen | 242/194 |
| 3,829,203 | 8/1974 | Novak | 352/78 R |
| 3,831,882 | 8/1974 | Fitterer | 242/199 |
| 3,889,900 | 6/1975 | Nelson | 242/199 |

*Primary Examiner*—Leonard D. Christian
*Attorney, Agent, or Firm*—Lewis H. Eslinger; Alvin Sinderbrand

[57] ABSTRACT

A tape cassette having two substantially coplanar reels with tape wound on at least one of the reels and extending along a defined path within the cassette housing to the other reel, the ends of the tape being attached to the respective reels. The path is at least partly defined by guide means comprising a guide member to control the location of one edge of the tape very accurately. The guide member has at least one surface portion with a conical configuration, and the tape makes contact with this conical portion around only a limited arc. The axis of the conical portion of the guide member is substantially parallel to the axis of the adjacent roller, and the included conical angle defined by the conical surface is very small. The guide member has a shoulder that extends substantially perpendicularly outwardly from the conical axis at the constricted end of the conical surface to serve as a guide surface for one edge of the tape. The tape is urged against the shoulder by the force created by longitudinal tension in the tape against the conical section. The two guide members may be provided, one near each reel and both having conical surface portions tapered in opposite directions with respect to each other to permit the cassette to be inverted to allow the tape to travel in both directions while keeping the edge that is moving forward guided.

9 Claims, 9 Drawing Figures

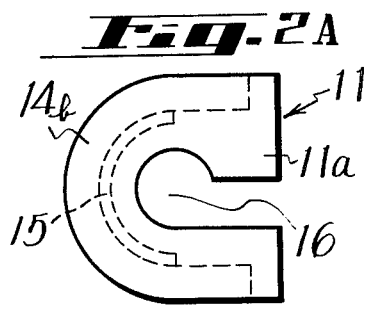
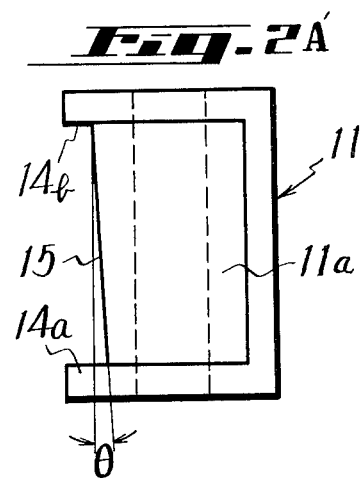
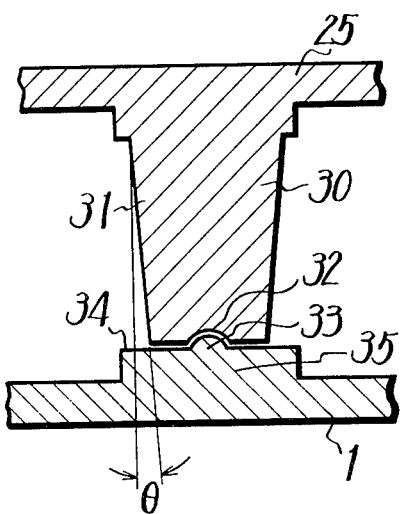
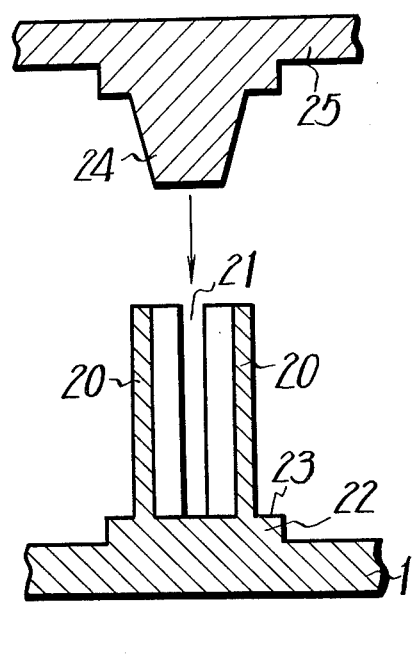
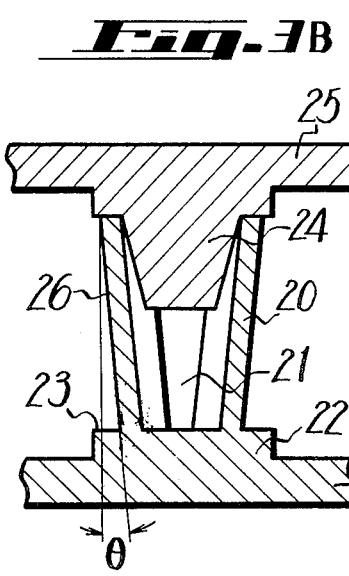
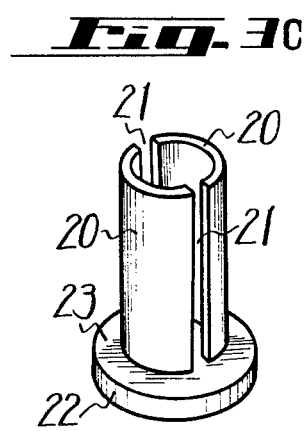

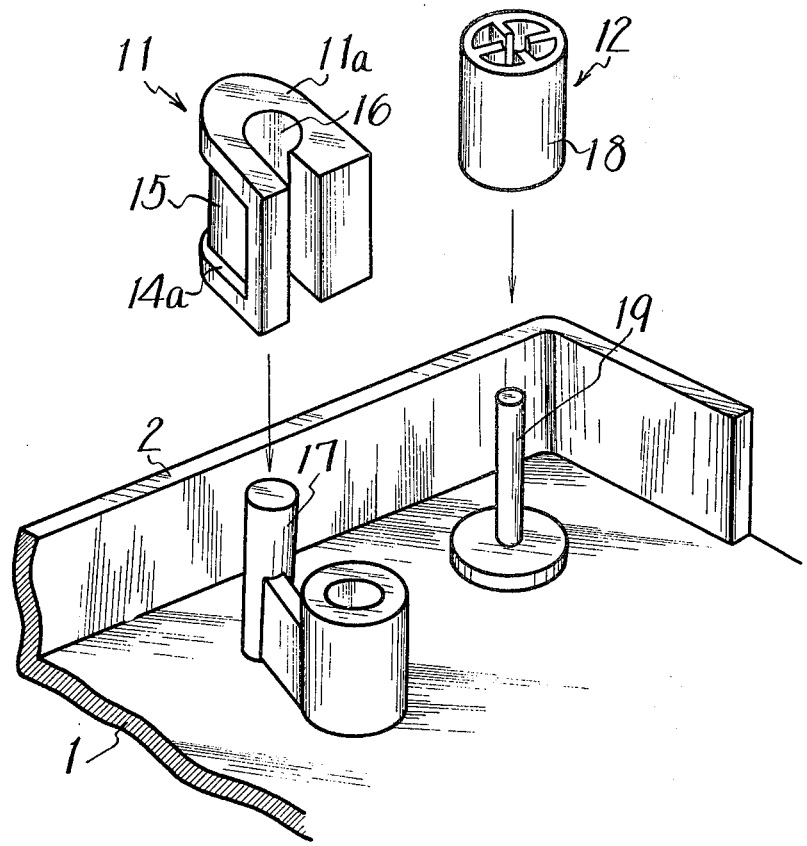
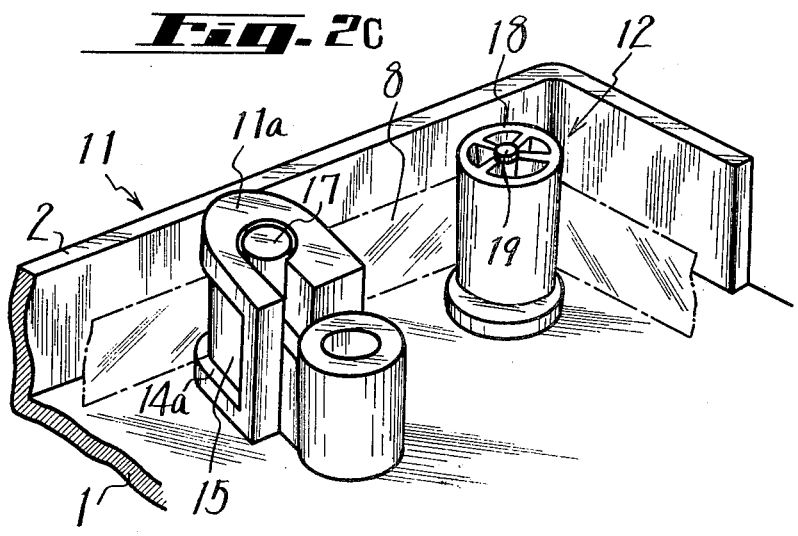

TAPE CASSETTE

BACKGROUND OF THE INVENTION

1. Field of the Invention

This invention relates to a tape cassette for use with a tape recording and/or reproduction device and, more particularly to a tape cassette including a housing having a forward zone adapted to receive the magnetic head of the device, a pair of spools arranged side by side in the same plane, and a magnetic tape extending along said forward zone from one of said spools to the other, and finally, guiding means for the tape.

2. The Prior Art

There have been developed and are known extremely compact tape recorders. The cassettes for use with such tape recorders are extremely small and commercially known as "mini-cassettes" or micro-cassettes. The magnetic tape used in such cassettes has an extremely small width (below 5 mm).

In order to obtain the desirable quality of reproduction with such devices, it is extremely important that accurately defined guidance of the tape within the cassette in relation to the magnetic head of the device be achieved.

Since all component parts of both the cassette and the recorder, such as the guiding means, the spools, the magnetic head and the like, are of extremely small size, it is particularly difficult to provide for the tape to be moved with sufficient stability. Besides the smallness of the cassette, the recorder and the component parts thereof, the fact should be taken into consideration that in the case of a four-channel stereo program the information content will have to be accommodated within one-half of the width of the extremely narrow tape. When a so-called direct four-channel system is used, it is necessary to accommodate four tracks within one-half of the width of the tape. When use is made of a so-called matrix four-channel system there will have to be accommodated within one-half of the tape width two tracks whose information content is interlinked by a phase matrix. It is particularly in the latter case that it is necessary for the achievement of a satisfactory quality of recording and reproduction to keep the narrow tape free of any mechanical vibrations as it is guided past the magnetic head of the recorder.

In order to obtain improved and well defined tape guidance in cassettes of the small size mentioned, it has been proposed in U.S. Pat. No. 3,735,940 to provide the tape guiding arrangement with a guide roller having a convex peripheral surface such as to produce a self-centering action of the tape in relation to the guide roller. However, this known arrangement does not provide for accurately defined guidance of the tape since even in the presence of a convex guide surface the tape is allowed to migrate upwardly or downwardly within limits until it comes into contact with suitable shoulders.

In U.S. Pat. No. 3,677,494 there have been proposed oblique guiding means which, however, are intended to guide the tape from the winding plane of one spool to the winding plane of the other spool which is at a higher elevation than the first winding plane.

It is an object of this invention to provide, particularly in the case of the well-known mini- or micro-cassettes, for the tape to be guided in relation to the magnetic head of the recorder in such a manner as to preclude vibrations of the tape and to maintain the tape at an accurately defined level.

SUMMARY OF THE INVENTION

In order to achieve this object, it is proposed by this invention to provide a cassette of the type indicated with guide means comprising at least one guide member which has a guiding surface which extends at an acute angle in relation to the plane of the tape and which is adapted to guide one of the longitudinal edges of the tape against a shoulder with which the guide member is provided. The guide surface extending at the acute angle causes one longitudinal edge of the tape accurately to abut one shoulder of the guide member, the tape thus being caused to move at an accurately defined level. By suitably selecting or adjusting the said acute angle which preferably amounts to between 1° and 2°, it is possible to adjust, within limits, the lateral force acting to guide the tape towards the shoulder. The guide surface of the guide member is preferably formed of a plastics material having a particularly low coefficient of friction.

In a preferred embodiment of the invention, the oblique guide surface is constituted by a conical surface, and the shoulder extends at right angles in relation to the axis of the conical surface at the small-diameter end thereof. The guide member may either by fixedly located in the cassette housing or may be constituted by a roller supported for rotation by an axle attached to the housing.

In a particularly preferred embodiment of the invention, there is arranged, upstream or downstream of the guide member with reference to the direction of tape travel, a guide and direction-changing roll having a cylindrical periphery and disposed in such a manner that the tape is substantially in line contact only with the conical surface of the guide member. What is achieved by this arrangement is that the said guide and direction-changing roller substantially provides only for the change in the direction of tape travel and that the tape contacts the guide member, i.e. the oblique guide surface substantially only along a line extending transversely of the tape. This arrangement provides for a particularly low-friction guiding action, and the tape is brought into the desired guided position without being subjected to any major mechanical stress.

When, in another embodiment of the invention, guide members each having an oblique guide surface are provided on either side of the cassette between the respective spool and the forward zone receiving the magnetic head, a particularly advantageous arrangement is possible by having the guide surfaces of the guide members arranged on both sides of the said forward zone in such a manner that they are of opposed inclination, the result being that on the one side the upper edge of the tape and on the other side the lower edge of the tape is brought into contact with the shoulder of the associated guide member. This arrangement makes it possible, in a simple manner, to use the cassette in two different positions with the tape moving in opposite directions. With the tape traveling in either of the two directions, the tape will then be maintained in an accurately defined guided position in relation to the magnetic head of the recorder.

Further embodiments of the invention are defined by the subclaims. The novel features of the invention will be understood from the detailed description which

BRIEF DESCRIPTION OF THE DRAWING

FIG. 2A and FIG. 2A' are an end view and a side elevational view, respectively, of a guide member;

FIG. 2B is an exploded, fragmentary perspective view showing the first embodiment of a guide member according to FIGS. 2A and 2A' prior to insertion thereof into a cassette;

FIG. 2C is a fragmentary perspective view corresponding to FIG. 2B and showing a guide member and a guide roller in position in a cassette;

FIG. 3A is an exploded sectional view of another embodiment of a guide member shown before the two main parts of a cassette are assembled together;

FIG. 3B is a sectional view of the embodiment of FIG. 3A shown after the two main parts of a cassette having been united;

FIG. 3C is a perspective view of the lower portion of the embodiment of FIGS. 3A and 3B; and FIG. 4 is a sectional view of still another embodiment of a guide member.

DESCRIPTION OF THE PREFERRED EMBODIMENTS

Figure 1:
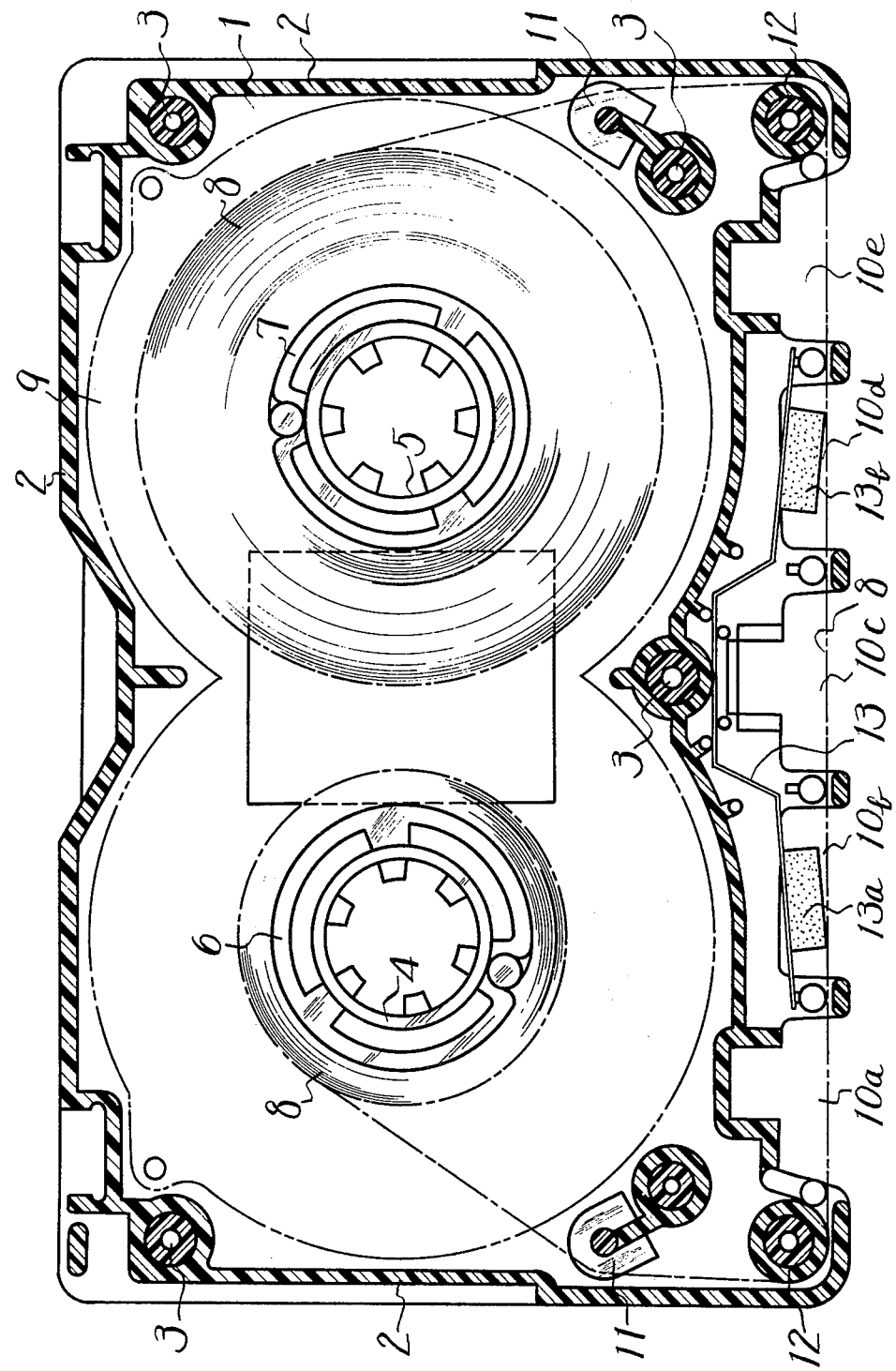
FIG. 1 is a horizontal cross-section of a cassette.

The cassette shown in horizontal section in FIG. 1 comprises in a per se known manner a bottom 1 having peripheral walls 2 adapted in a per se known manner to secure thereto a cover not shown in the drawing. Conveniently, such a cassette is made in two parts, the bottom 1 with its peripheral walls 2 being connected to the cover by means of pins 3. The peripheral walls 2 of the cassette are provided, in a per se known manner, with recesses and windows or the like adapted accurately to handle and locate the cassette within the recorder and directly or indirectly to operate control members within the recorder serving to control the tape speed, etc. As these provisions do not constitute a part of the invention they are not described in detail.

Arranged in the cassette on two hubs 4 and 5 are two spools 6 and 7 supporting a magnetic tape 8. One insert 9 made of a sheet material having a low coefficient of friction is disposed between the bottom 1 and two spools and a similar insert is disposed between the cover (not shown) and the two spools, the tape 8 lying between the two inserts. According to the lower part of FIG. 1, the front portion of the cassette is provided with a plurality of recesses 10a to 10e in front of which the tape 8 will move as it is transported, via guide members 11 and idler roller 12, from spool 7 to spool 6. With the cassette inserted into a recorder, the recesses 10a to 10e will, in a per se known manner, receive the magnetic head and the capstans driving the tape. According to FIG. 1 there is also provided a spring clip 13 carrying supporting pads 13a and 13b.

The remaining Figures show the structural details of various embodiments of the guide members 11. In the embodiment of FIGS. 2A to 2C, the guide member 11 comprises an integrally preformed member 11a made of a plastics material having a low coefficient of friction and provided with an upper shoulder 14b and a lower shoulder 14a between which there extends a guiding surface 15 which is of conical shape at least along that part of its periphery which cooperates with the tape. The taper of the conical surface 15 is selected such that the conical surface is at an acute angle 0 with the plane of the tape to cause the tape to be always gently guided against the lower shoulder 14a. The preformed member 11a has a recess 16 permitting the member to be slid onto a stationary pin 17 attached to the bottom 1 of the cassette in the manner shown in FIGS. 2B and 2C. Adjacent to the guide member 11 there is provided a guiding and direction-changing member 12 having a roller 18 cooperating with tape 8 and supported for rotation by a pin 19 fixedly attached to the cassette housing. Due to the presence of the roller 18, the tape cooperating with the guiding surface 15 of guide member 11 is subjected to a slight change in direction only, this causing the inclined guiding surface 15 to contact the tape within a narrow zone of contact extending transversely of the length of the tape.

In the embodiment shown in FIGS. 3A to 3C, a different guide member to take the place of the guide members 11 in FIG. 1 is formed of two semicylindrical shell portions 20 which are separated by diametral slots 21 and integrally connected with a plate portion 22 forming a shoulder 23 which, in turn is, formed integrally with the bottom 1 of the cassette. As particularly shown in FIG. 3B, assembling the bottom 1 of the cassette with a cover 25 will cause the two shell portions 20 to be spread apart by a tapered spreading portion 24 of the cover 25, the result being that an oblique guiding surface 26 is formed which is inclined to the vertical axis of the shell portions by an angle $\theta$. In the case of the embodiment just described, the shell portions 20 of one of the guide members are integrally formed with the cover plate 25, the associated spreading member being integrally formed with the bottom 1 of the cassette so that the guide members thus formed to take the place of the guide members 11 in FIG. 1 have oppositely inclined surfaces.

In the case of the embodiment shown in FIG. 4, the guide member is constituted by a conical projection 30 which is integrally formed with the cover plate 25 of the cassette, the tapered surface 31 forming the guiding surface extending at the angle $\theta$ in relation to the vertical. The free end face of the conical projection 30 is provided with a centering recess 32 which, with the parts of the cassette in their assembled condition, is in engagement with a centering boss 33 formed on a projection 35 of bottom 1 which, in turn, forms a shoulder 34. The projection 35 is integrally formed with the bottom 1 of the cassette. Also with this embodiment, the conical projection 30 of one of the two guide members is formed on the bottom 1, the corresponding centering boss 33 being formed on the associated projection 35 of the cover plate 25 of the cassette.

I claim:

1. A tape cassette comprising a housing having a pair of parallel walls and a forward portion with openings therein to receive magnetic head means; a pair of spools disposed side by side in a common plane between said walls; a magnetic tape wound onto at least one of said spools, each end of said tape being attached to a respective one of said spools, and a portion of said tape extending along a path from one of said reels to the other and defining a planar section of said path; tape guide means to define at least part of said path, said guide means comprising at least one guide roller having a guiding surface comprising a conical portion at an acute angle with the magnetic tape in said planar section to guide one of the longitudinal edges of the tape toward the constricted end of said conical portion, a shoulder extending substantially perpendicularly to the axis of said conical portion at the restricted end of said conical portion, and an axle for said roller, said axle being rigidly connected to said housing in a region of said path between said guide member and the adjacent one of said openings.

2. The tape cassette of claim 1 in which said guide member is fixedly attached to one of said walls.

3. The tape cassette of claim 1 in which said roller comprises a cylindrical periphery and said guide member is located between said roller and the nearer of said reels and in a location such that said tape makes substantially only line contact with said conical portion.

4. The tape cassette of claim 1 in which said tape guide means comprises a second guide member, each of said guide members being located between the respective nearer reel and said forward portion of said housing, said second guide member having a guiding surface comprising a conical portion at an acute angle with respect to the transverse direction of said magnetic tape, and a shoulder extending substantially perpendicularly to the axis of said conical portion at the restricted end of said conical portion, the restricted end of said conical portion of said second guide member being oppositely directed in said housing with respect to said restricted end of said first-named conical portion.

5. The tape cassette of claim 1 in which said acute angle is between approximately .1° and 15°.

6. The tape cassette of claim 5 in which said acute angle is between approximately 1° and 2°.

7. The tape cassette of claim 1 in which said guide member comprises a positioning pin rigidly attached to one of said walls; and a separate member nonrotatably fitting over said pin and comprising said conical portion and said shoulder.

8. The tape cassette of claim 1 in which said guide member comprises two co-axial semi-cylindrical shell portions extending substantially parallel to the axes of said reels and rigidly attached to an inner surface of one of said walls and extending toward a juxtaposed surface of the other of said walls; and a spreading member attached to said juxtaposed surface and fitting into the open ends of said semicylindrical shell portions to force the ends apart to cause said shell portions to define substantially a conical surface comprising said conical portion.

9. The tape cassette of claim 1 in which said guide member comprises a conical projection rigidly attached to said housing at an interior surface of one of said walls and extending toward the other of said walls and having a recess in the end of said conical projection; a centering boss on said other wall to engage a recess in the end of said conical projection; and a shoulder surrounding said boss and attached to said other wall.

* * * * *